(12) United States Patent
Collins et al.

(10) Patent No.: US 11,214,010 B2
(45) Date of Patent: Jan. 4, 2022

(54) ROLLER CONTROL FOR A 3D PRINTER

(71) Applicant: HEWLETT-PACKARD DEVELOPMENT COMPANY, L.P., Spring, TX (US)

(72) Inventors: Eric Scott Collins, Vancouver, WA (US); Joshua Morgan Hunsaker, Vancouver, WA (US); Alvin Post, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 276 days.

(21) Appl. No.: 16/509,060

(22) Filed: Jul. 11, 2019

(65) Prior Publication Data

US 2021/0008803 A1 Jan. 14, 2021

(51) Int. Cl.
*B29C 64/393* (2017.01)
*B33Y 10/00* (2015.01)
*B29C 64/218* (2017.01)
*B33Y 50/02* (2015.01)
*B29C 64/165* (2017.01)
*B33Y 30/00* (2015.01)

(52) U.S. Cl.
CPC .......... *B29C 64/393* (2017.08); *B29C 64/165* (2017.08); *B29C 64/218* (2017.08); *B33Y 10/00* (2014.12); *B33Y 30/00* (2014.12); *B33Y 50/02* (2014.12)

(58) Field of Classification Search
CPC ... B29C 64/393; B29C 64/165; B29C 64/218; B33Y 10/00; B33Y 30/00
See application file for complete search history.

(56) References Cited

U.S. PATENT DOCUMENTS

| 5,902,537 | A | 5/1999 | Almquist et al. |
| 6,656,410 | B2 | 12/2003 | Hull et al. |
| 8,105,066 | B2 | 1/2012 | Sperry et al. |
| 2017/0361500 | A1 | 12/2017 | Hochsmann et al. |
| 2018/0133956 | A1 | 5/2018 | Buller et al. |
| 2018/0207872 | A1 | 7/2018 | Klein et al. |
| 2018/0229428 | A1* | 8/2018 | Takano ................. B29C 64/218 |

FOREIGN PATENT DOCUMENTS

| KR | 20190023179 | | 3/2019 |
| KR | 20190023179 | A * | 3/2019 |
| KR | 20190039664 | | 4/2019 |

* cited by examiner

*Primary Examiner* — Yung-Sheng M Tsui
*Assistant Examiner* — Melody Tsui
(74) *Attorney, Agent, or Firm* — Dierker & Kavanaugh PC (57) ABSTRACT

In one example, a roller control process for a 3D printer includes stopping the layering roller rotating at angular home before the roller reaches linear home at the end of a fusing pass, measuring the duration between when the roller reaches angular home and when the roller reaches linear home, and, if the duration exceeds a threshold, then stopping the roller rotating at angular home at a distance closer to linear home in subsequent fusing passes until the duration does not exceed the threshold.

15 Claims, 13 Drawing Sheets

ROLLER CONTROL FOR A 3D PRINTER

BACKGROUND 3D printers produce objects by building up layers of material. 3D printers are sometimes also referred to as additive manufacturing machines. 3D printers convert a CAD (computer aided design) model or other digital representation of an object into the physical object. The model data may be processed into slices each defining that part of a layer of build material to be formed into the object.

DRAWINGS

The same part numbers designate the same or similar parts throughout the figures. The figures are not to scale. The scale of the layers of build material and object slices is greatly exaggerated in the figures. Each layer of build material in a fusing process such as that shown in FIGS. 1-18 may be less than 100 µm thick, with hundreds or thousands of layers to manufacture an object.

DESCRIPTION

In some 3D printers, heat is used to fuse together particles in a powdered build material to form a solid object. Heat to fuse the build material may be generated, for example, by applying a liquid fusing agent to a thin layer of build material in a pattern based on the object slice and then exposing the patterned build material to fusing light. Light absorbing components in a fusing agent absorb light energy to help heat the patterned build material above the fusing temperature, to sinter or melt and thus fuse the build material. The process is repeated layer by layer and slice by slice to complete the object.

A roller is often used to spread build material in layers for 3D printing. The roller is carried back and forth over the work surface to spread each layer of build material. It may be desirable to begin each layering pass with the roller in the same linear and angular/rotational "home" positions so that, while spreading the build material, any mechanical variation in roller height due to drive components is aligned to the previous layer to help maintain uniform layer thickness.

In some 3D printers the layering roller and fusing lamps are carried back and forth over the work surface together on a single carriage. During fusing the roller may be exposed to heat from the fusing lamps. To avoid the fusing lamps creating hot spots on the roller, the roller may be rotated during fusing. The roller should be stopped at angular home after each fusing pass in preparation for the next layering pass. Because the roller may be susceptible to hot spots any time it is not rotating, the roller should be stopped rotating at nearly the same time it reaches linear home. However, the translational speed of and the distance traveled by the carriage, and the rotational speed of the roller may be different during layering and fusing, thus complicating the task of returning the roller to angular home close to linear home.

Accordingly, a new roller control process has been developed to help ensure that the layering roller is stopped at its angular home position close to linear home at the end of each fusing pass, in preparation for the next layering pass. In one example, a roller control process for a 3D printer includes stopping the layering roller after a preset number of revolutions that end at angular home, measuring the duration between when the roller reaches angular home and when the roller reaches linear home, and, if the duration exceeds a threshold, then (1) rotating the roller slower for the preset number of revolutions and/or (2) start the roller rotating the preset number of revolutions a distance closer to linear home in subsequent fusing passes, so that the roller reaches angular home closer to linear home. The process is repeated iteratively in subsequent fusing passes until the duration does not exceed the threshold.

Examples of the new process are also useful for 3D printing techniques in which a binding agent applied to the build material is cured with light and/or heat to form a "green part" that is subsequently heated in a sintering furnace to form the final object. Accordingly, "fusing" as used in this document includes curing a binding agent during 3D printing as well as melting and sintering.

These and other examples described below and shown in the figures illustrate but do not limit the scope of the patent, which is defined in the Claims following this Description.

As used in this document: "and/or" means one or more of the connected things; "fusing" includes melting, sintering, and binding (including curing a binder); "memory" means any non-transitory tangible medium that can embody, contain, store, or maintain instructions and other information for use by a processor and may include, for example, circuits, integrated circuits, ASICs (application specific integrated circuits), hard drives, random access memory (RAM), and read-only memory (ROM); a "number of revolutions" includes an integer number of revolutions and/or a fractional number of revolutions, and may be determined, for example, by rotary encoder counts; and "work surface" means any suitable structure to support or contain build material for fusing, including underlying layers of build material and in-process slice and other object structures.

Figure 1:
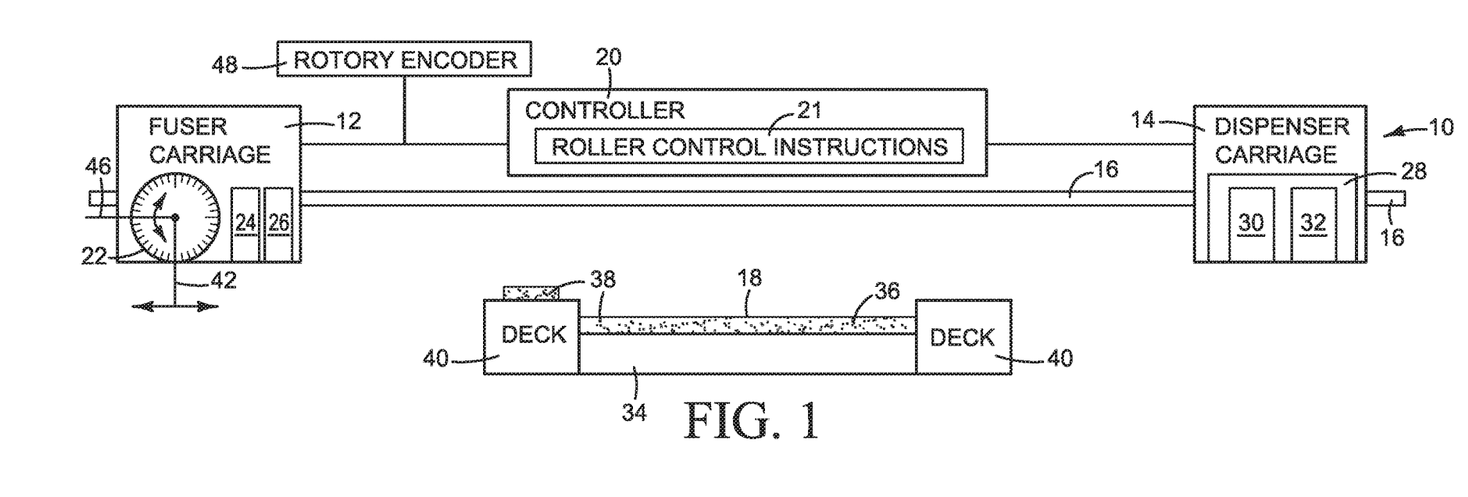
FIGS. 1-18 illustrate a fusing system implementing one example of a roller control process for layering build material in a 3D printer.

FIGS. 1-18 illustrate a fusing system 10 implementing one example of a roller control process for layering build material in a 3D printer. Referring to FIG. 1, fusing system 10 includes a first, "fuser" carriage 12 and a second, "dispenser" carriage 14. Carriages 12 and 14 move back and forth on a rail 16 over a work surface 18. System 10 also includes a controller 20 with roller control instructions 21. Controller 20 represents the processing and memory resources, programming, and the electronic circuitry and components needed to control the operative elements of system 10.

Fuser carriage 12 carries a layering roller 22, a warming lamp 24, and a fusing lamp 26. While a single layering roller 22 and a single fusing lamp 26 are shown, multiple rollers 22 and/or multiple fusing lamps 26 may be used. Dispenser carriage 14 carries an inkjet printhead assembly or other suitable liquid dispensing assembly 28 to dispense a fusing agent. Assembly 28 may also dispense other agents. In this example, dispensing assembly 28 includes a first dispenser 30 to dispense a fusing agent and a second dispenser 32 to dispense a fusing agent, a modifier agent, a coloring agent and/or other functional agents.

For a first layer of build material, for example, work surface 18 may be formed on the surface of a platform 34 that moves up and down to accommodate the layering process. For succeeding layers of build material, work surface 18 is the underlying structure 36. In FIG. 1, underlying structure 36 is a first layer of build material powder 38. While a powdered build material 38 is described, other types of build material could be used. Build material without any agent is depicted by light stippling in the figures, build material with fusing agent is depicted by dark stippling, and fused build material is depicted by cross hatching.

In FIG. 1, a pile of build material 38 has been deposited along a deck 40 adjacent to work surface 18 in preparation for the next layering cycle. Fuser carriage 12 with roller 22 is positioned at a first, linear home position 42 to begin each outbound layering pass. Linear home 42 depicts the home position of roller 22 linearly along the axis of travel back and forth over surface 18. Linear travel is referred to herein as translation. Roller 22 starts rotating from an angular home position 46 for each outbound layering pass. In some examples, angular home 46 may be shifted 1° or another small fraction of one roller revolution in successive fusing passes to index angular home around roller 22. Indexing angular home exposes a different segment of the roller to the fusing lamp in successive fusing cycles to help prevent hot spots. The indexing fraction is made small enough to not adversely affect forming uniform layers of build material. A rotary encoder 48 or other suitable sensing device determines the angular position of roller 22.

Figure 2:
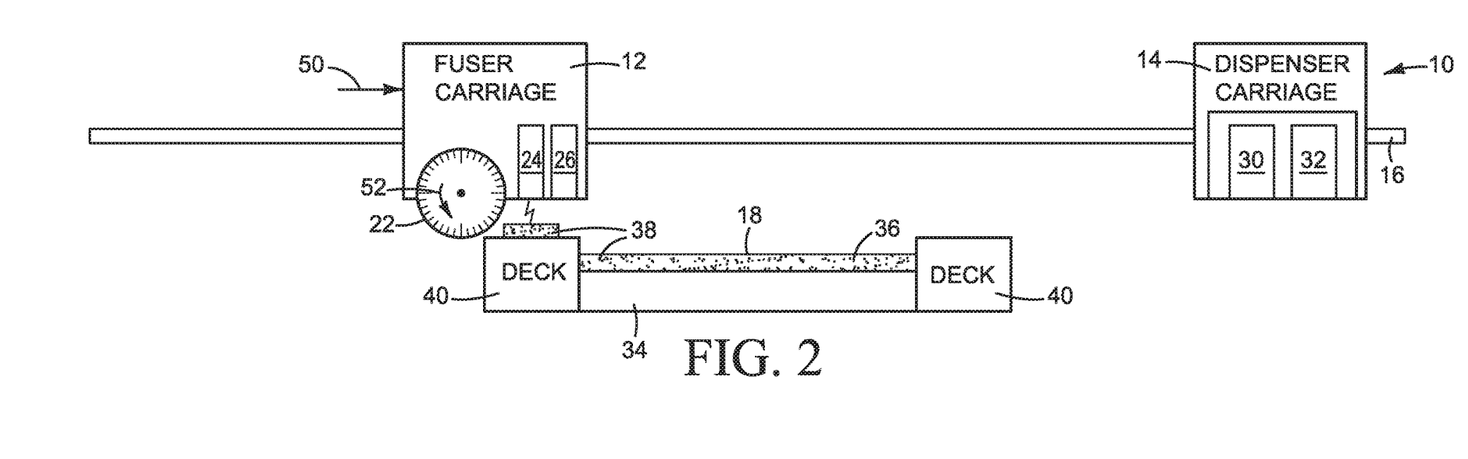
Figure 3:
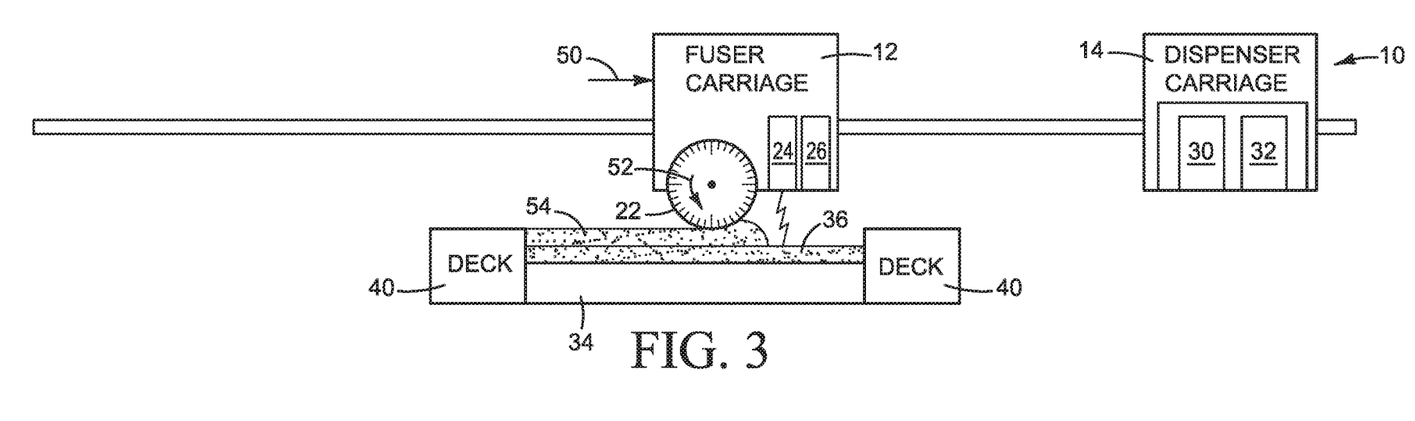
Figure 4:
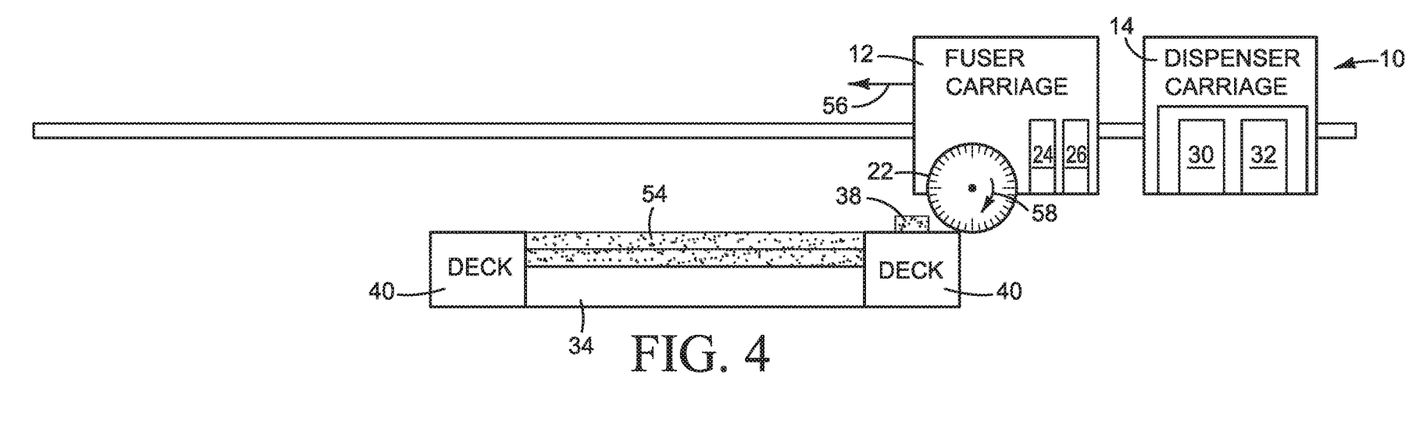
Figure 5:
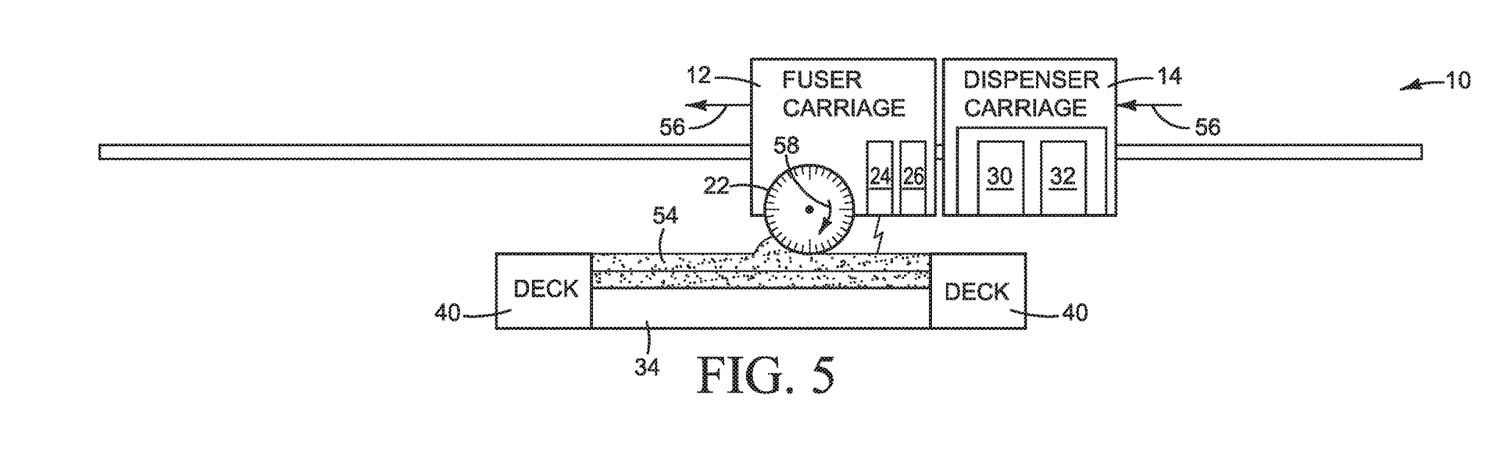

In FIG. 2, fuser carriage 12 is moving to the right with roller 22 deployed and rotating counter-clockwise in an outbound layering pass, as indicated by motion arrows 50 and 52. In FIG. 3, as fuser carriage 12 continues moving to the right, warming lamp 24 heats first layer 36 while roller 22 spreads powder 38 in a second layer 54 over first layer 36. In FIG. 4, fuser carriage 12 and roller 22 reverse direction at the end of the outbound layering pass to begin a return layering pass. Roller 22 may be retracted at the end of the outbound layering pass to jump any residual powder 38 pushed onto deck 40 and then deployed for the return layering pass. In FIG. 5, fuser carriage 12 is moving to the left in the return layering pass with roller 22 rotating clockwise, as indicated by motion arrows 56 and 58. Warming lamp 24 is on to warm build material in layer 54.

Figure 6:
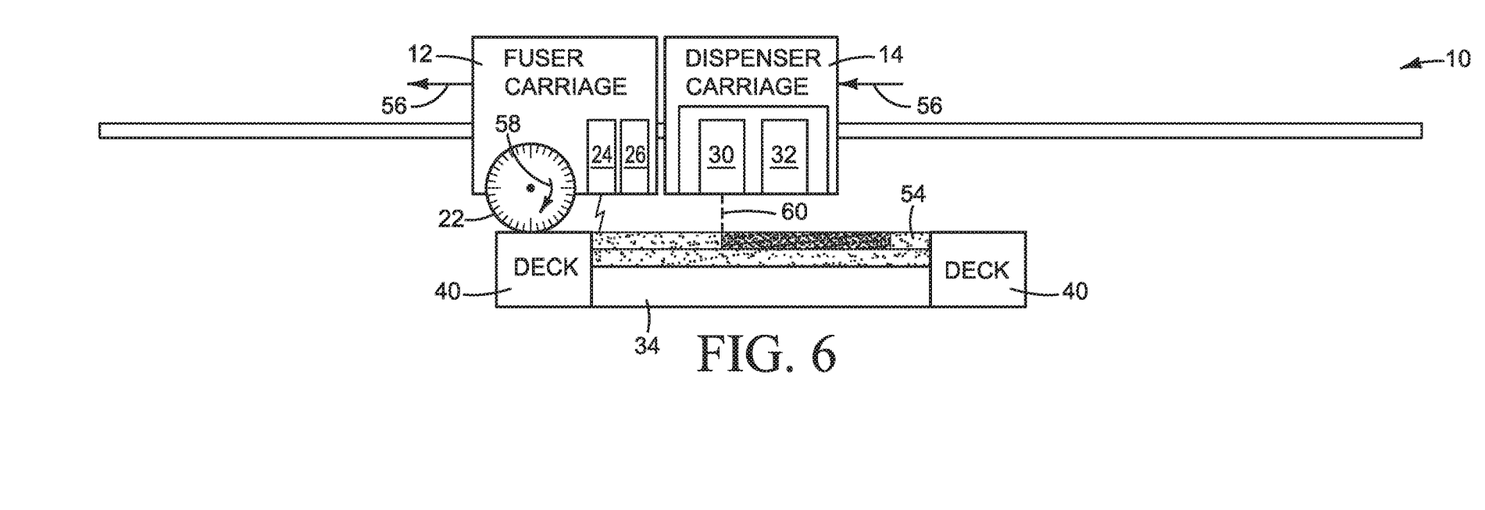

In FIG. 6, dispenser carriage 14 follows fuser carriage 12 on the return layering pass with dispenser 30 dispensing a fusing agent 60 on to build material in layer 54 in a pattern representing the corresponding object slice.

Figure 7:
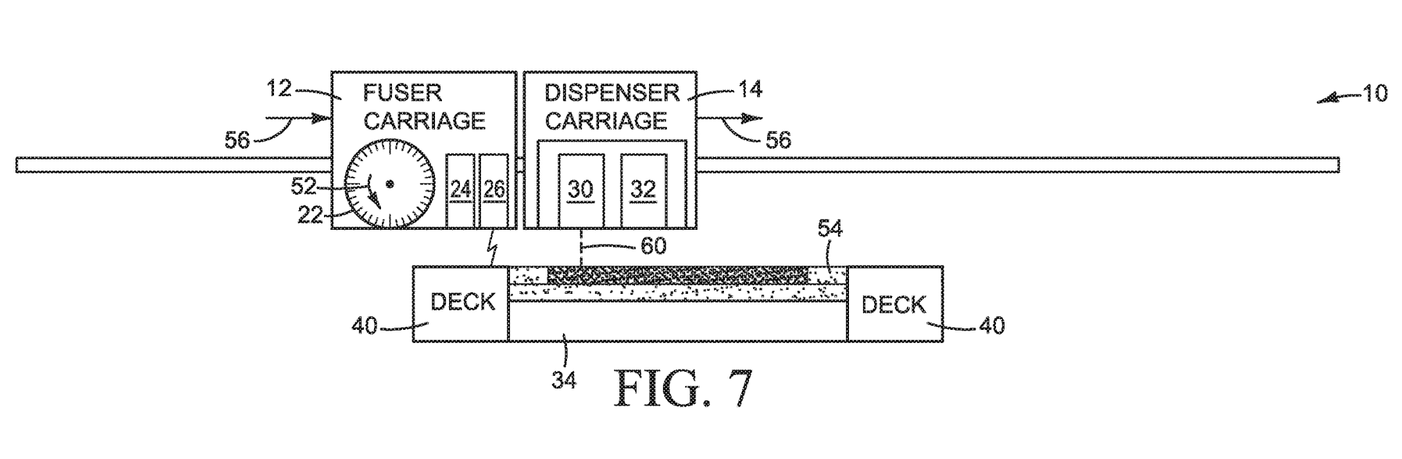
Figure 8:
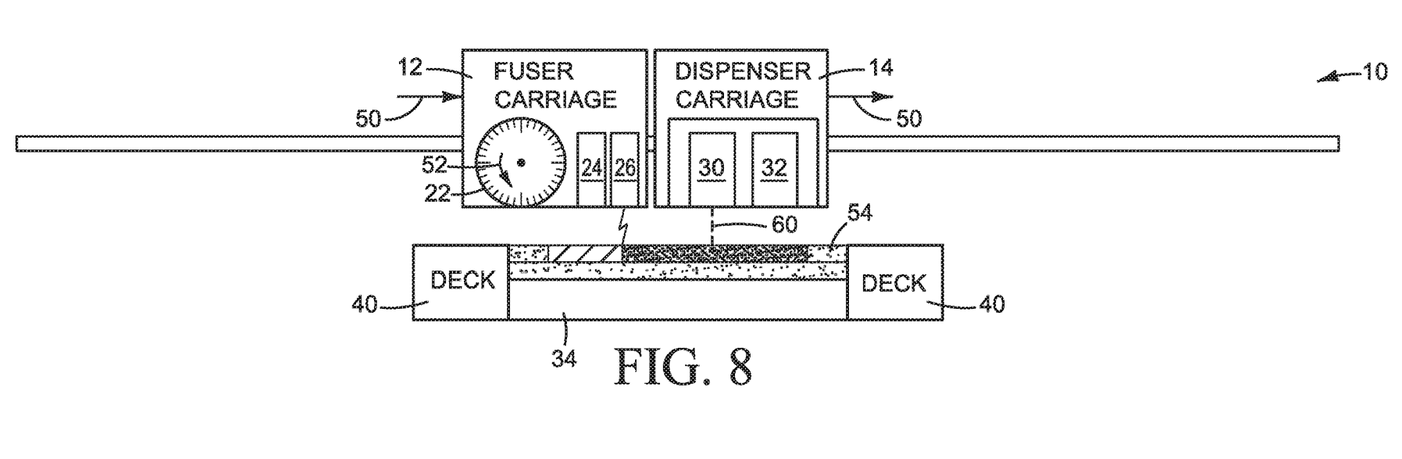

In FIG. 7, fuser carriage 12 and dispenser carriage 14 have reversed direction at the end of the return layering pass and are moving to the right in an outbound fusing pass with dispenser 30 dispensing additional fusing agent 60. Roller 22 is retracted during the fusing passes. Roller 22 is rotated during the fusing passes to avoid the fusing lamp creating hot spots on the roller. In FIG. 8, dispenser carriage 14 is moving to the right in the outbound fusing pass. Fuser carriage 12 follows dispenser carriage 14 with fusing lamp 26 on to irradiate and fuse patterned build material.

Figure 9:
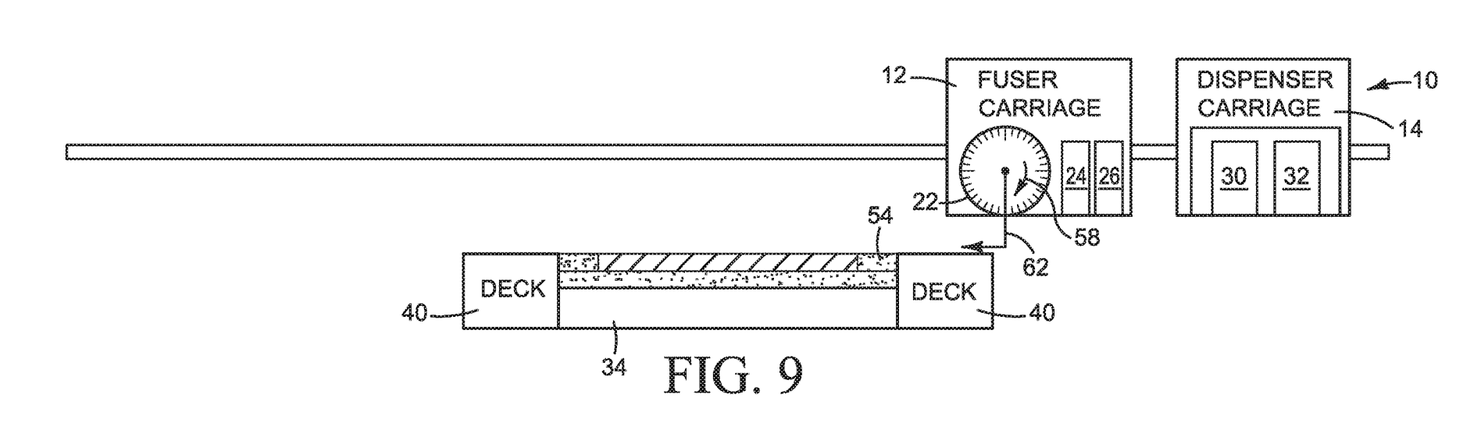
Figure 10:
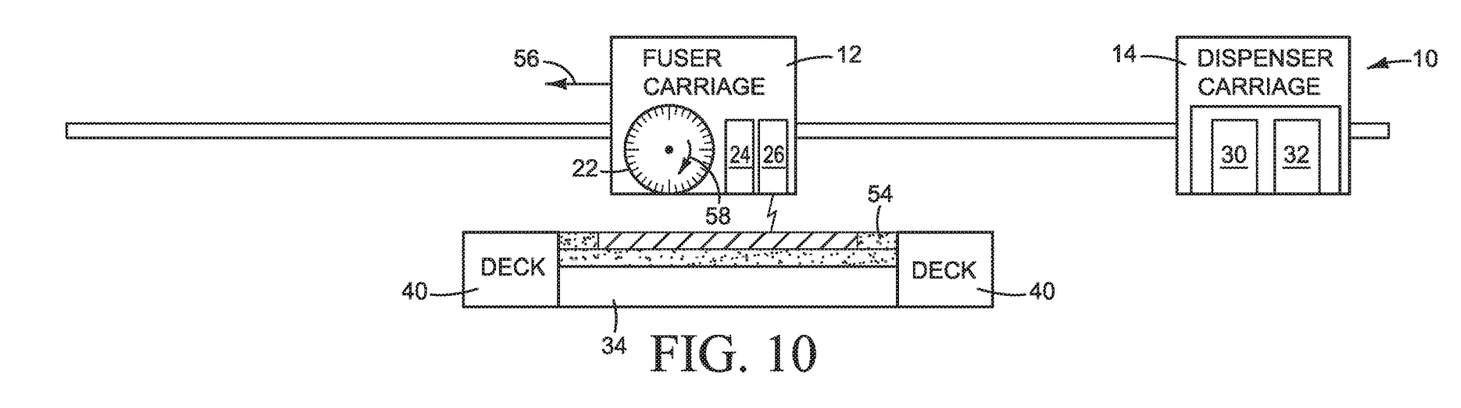

In FIG. 9, fuser carriage 12 reverses direction at the end of the outbound fusing pass to begin the return fusing pass. Roller 22 is stopped rotating counter-clockwise 52 (FIG. 8) at or near the end of the outbound fusing pass and is started rotating clockwise 58 at a "start" position 62 for the return fusing pass. In FIG. 10, dispenser carriage 14 is parked while fuser carriage 12 moves to the left in the return fusing pass with fusing lamp 26 on to irradiate build material in second layer 54.

Figure 11:
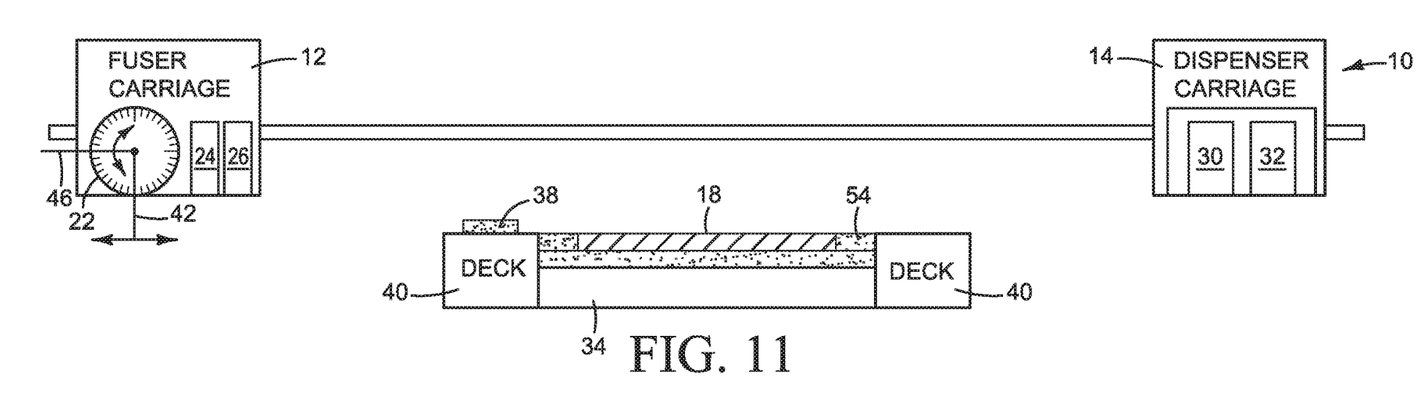

In FIG. 11, fuser carriage 12 with roller 22 has returned to linear home 42 to begin the next outbound layering pass. Carriage 12 stops instantaneously at linear home 42 to reverse direction for the next layering pass. Roller 22 is stopped rotating at angular home 46 before linear home 42 for the next layering pass. The duration between when roller 22 is stopped at angular home 46 and when carriage 12 (and thus roller 22) reaches linear home 42 is measured to determine the length of time of roller 22 is not rotating. If the duration between angular home 46 and linear home 42 exceeds a threshold, then roller 22 is stopped rotating at angular home 46 a distance closer to linear home 42 in subsequent return fusing passes until the measured duration does not exceed the threshold. In some implementations, it may be desirable to set a threshold for the minimum idle time in addition to the maximum threshold, to help ensure that roller 22 reaches angular home 46 before reaching linear home 42, in which case the measured duration is compared to a range that defines the minimum and maximum idle time thresholds. Although the idle time thresholds will vary depending on the characteristics of a fusing system 10, it is expected that an idle time duration in the range of 50 ms to 250 ms will reduce the risk of hot spots to an acceptable level for a fusing system that utilizes a 5,000 w fusing lamp 26 and a stainless steel roller 22 translating at about 15 ips and rotating with a tangential speed of about 5ips.

In one example, roller 22 is stopped rotating at angular home 46 a distance closer to (or farther from) linear home 42 by changing the rotational speed of roller 22 during the next return fusing pass. For example, where roller 22 is stopped rotating after a preset number of revolutions that end at angular home 46, slowing the rotational speed of roller 22 during the next return fusing pass will cause roller 22 to reach angular home 46 at a distance closer to linear home 42 than in the prior return fusing pass, shortening the duration between angular home 46 and linear home 42.

In another example, roller 22 is stopped rotating at angular home 46 a distance closer to (or farther from) linear home 42 by moving start position 62 in FIG. 9 closer to or farther from linear home 42. For example, where roller 22 is stopped rotating after a preset number of rotary encoder counts that end at angular home 46, moving reversing position 62 further from linear home 42 (moving it to the right in FIG. 9) causes roller 22 to reach angular home 46 at a distance farther from linear home 42 than in the prior return fusing pass, increasing the duration between angular home 46 and linear home 42.

Changes may be made iteratively in successive fusing passes at the direction of controller 20 executing programming instructions 21 until the measured duration does not exceed the maximum threshold, or until the measured duration falls within the desired range if minimum and maximum thresholds are used. (Controller 20 and instructions 21 are shown in FIG. 1.) The linear position that roller 22 reaches angular home 46 may be changed in each iteration in proportion to the amount the measured time exceeds the maximum threshold time (or is outside the range of minimum and maximum threshold times) to help reduce the number of iterations taken to reach the desired duration.

Figure 12:
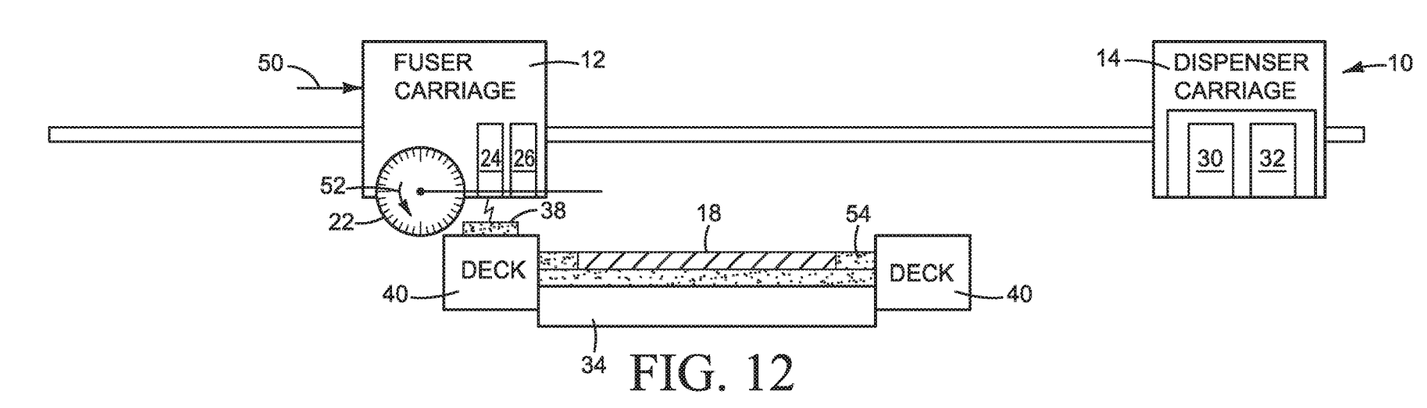
Figure 13:
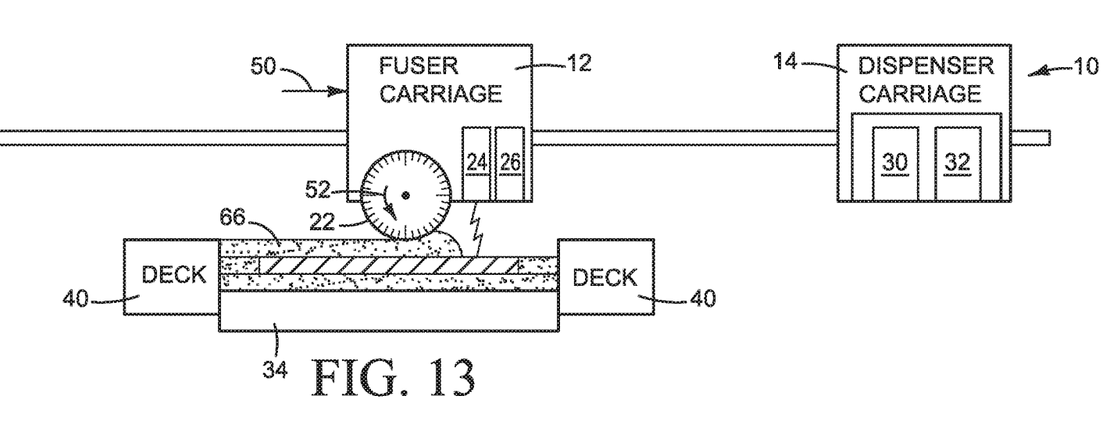
Figure 14:
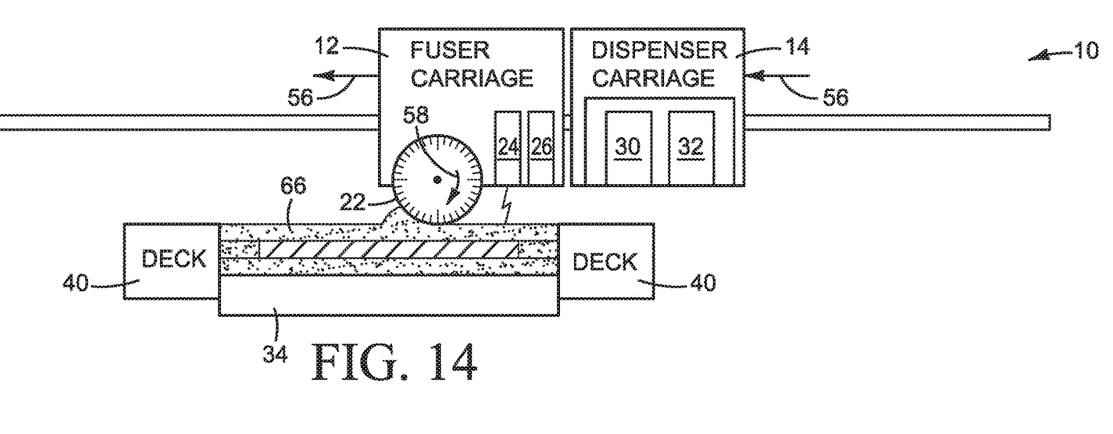
Figure 15:
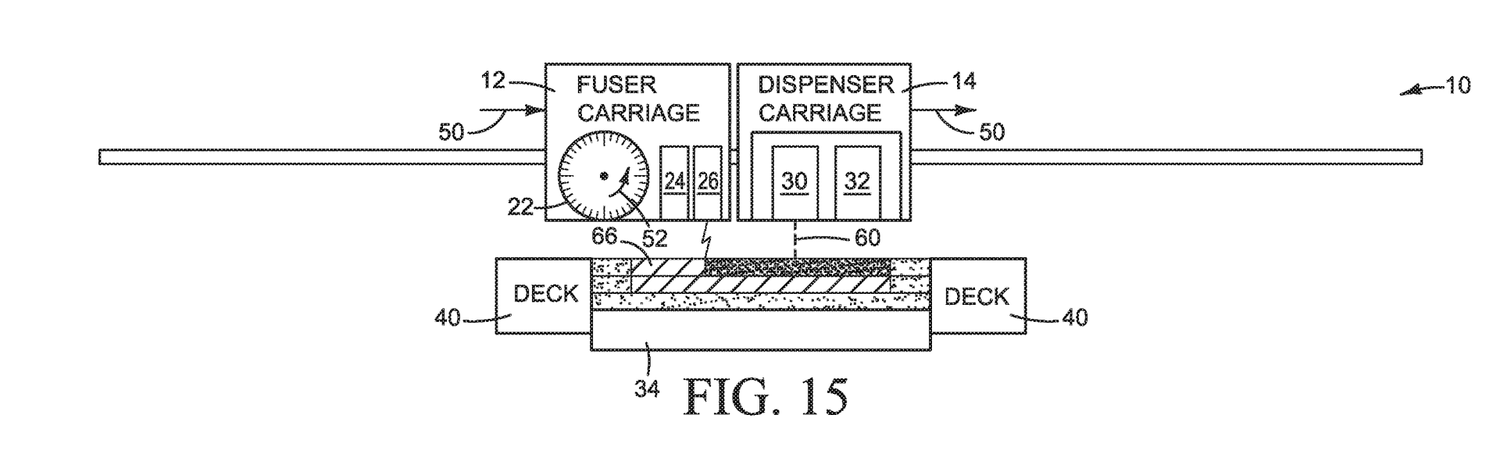
Figure 16:
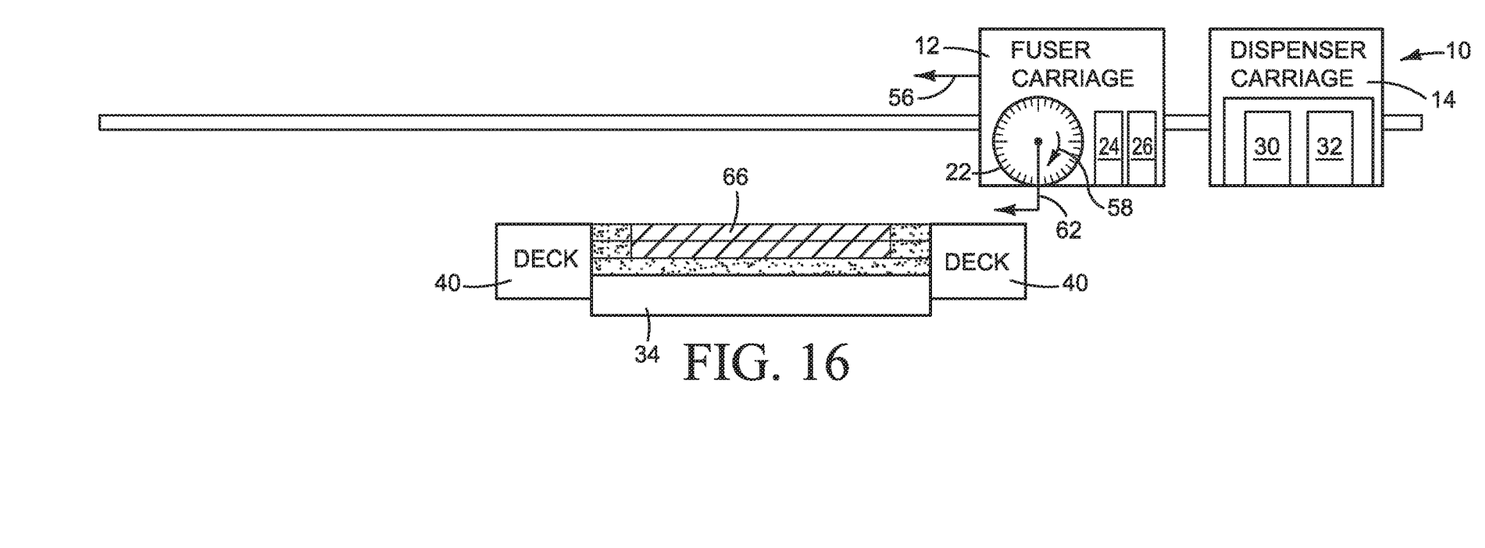
Figure 17:
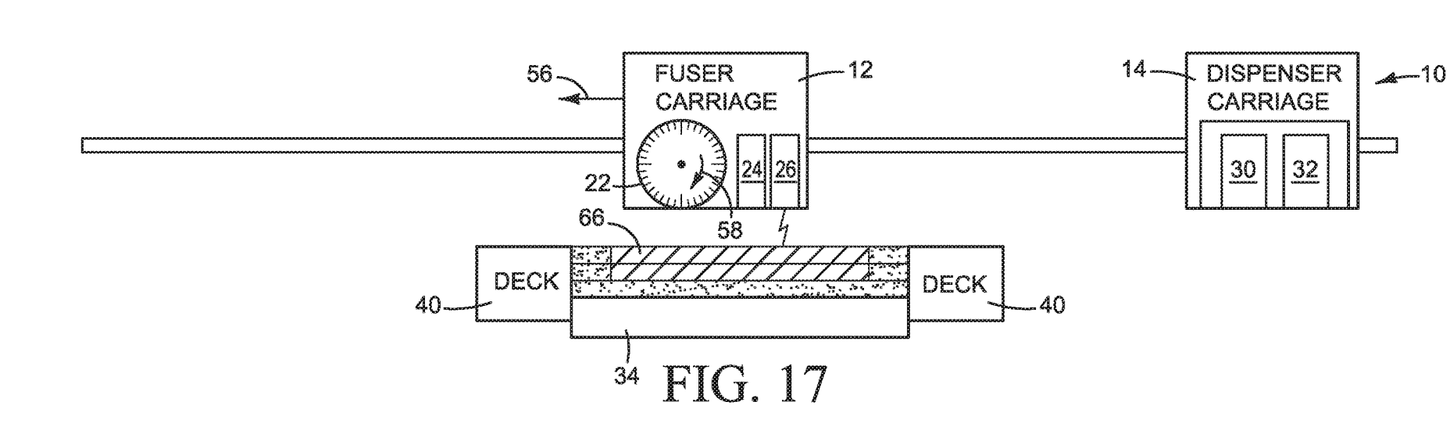
Figure 18:
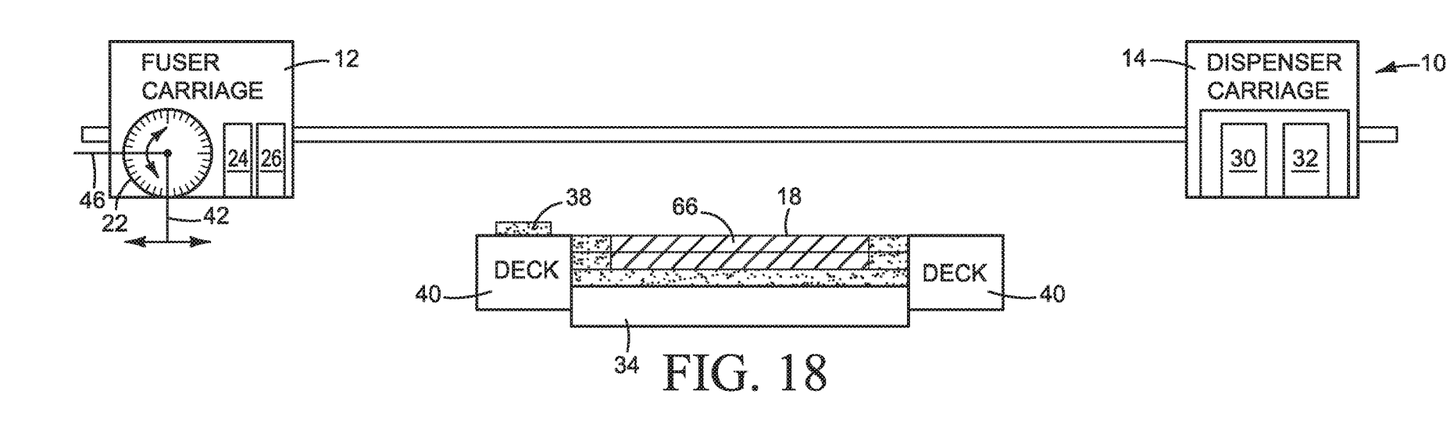

In FIGS. 12-14, the next, third layer 66 of build material is formed on work surface 18. In FIG. 15, fuser carriage 12 has reversed direction at the end of the return layering pass and is moving to the right in the outbound fusing pass. In FIG. 16, roller 22 is started rotating clockwise at position 62 in the return fusing pass. In FIG. 17, fuser carriage 12 is moving to the left in the return fusing pass. In FIG. 18, fuser carriage 12 with roller 22 has returned to linear home position 42 to begin the next outbound layering pass. Carriage 12 stops instantaneously at linear home 42 to reverse direction for the next layering pass. Roller 22 is stopped rotating at angular home 46 before linear home 42 to reverse direction for the next layering pass. The duration between when roller 22 reaches angular home 46 and when carriage 12 (and thus roller 22) reaches linear home 42 is measured to determine the length of time of roller 22 is not rotating, and changes are made in successive fusing passes, as described above, if the measured duration exceeds the maximum threshold or is outside the range if minimum and maximum thresholds are used.

Layering and fusing continues layer by layer and slice by slice to complete the object. In some 3D printers, tens or hundreds of layering and fusing cycles are performed at the beginning of a build operation, before forming the object slices, to calibrate fusing system and other printer components. Angular idle time adjustments as described above may be performed during these calibration cycles. Angular idle time adjustments may also be performed during object formation, continuously or periodically, to maintain proper roller angular idle time.

While it is expected that any roller idle time adjustments will be made iteratively during the immediate next successive fusing cycles, it may be desirable in some implementations to perform each iteration every other fusing cycle or every few fusing cycles.

Other processing and system sequences and configurations are possible. For example, while outbound and return layering and fusing passes are shown, it may be desirable in some implementations to layer the build material in a single outbound pass and fuse layered build material in a single return pass. The direction of translation and rotation of the layering roller (or rollers if multiple rollers are used) may be different from that shown for each layering and fusing pass. Also, while the layering roller and the fusing lamp are carried together on the same carriage in the examples shown in the figures, in other examples the roller and the fusing lamp may be carried on different carriages with roller carriage moving along a path orthogonal or parallel to the path of the fuser carriage.

Figure 19:
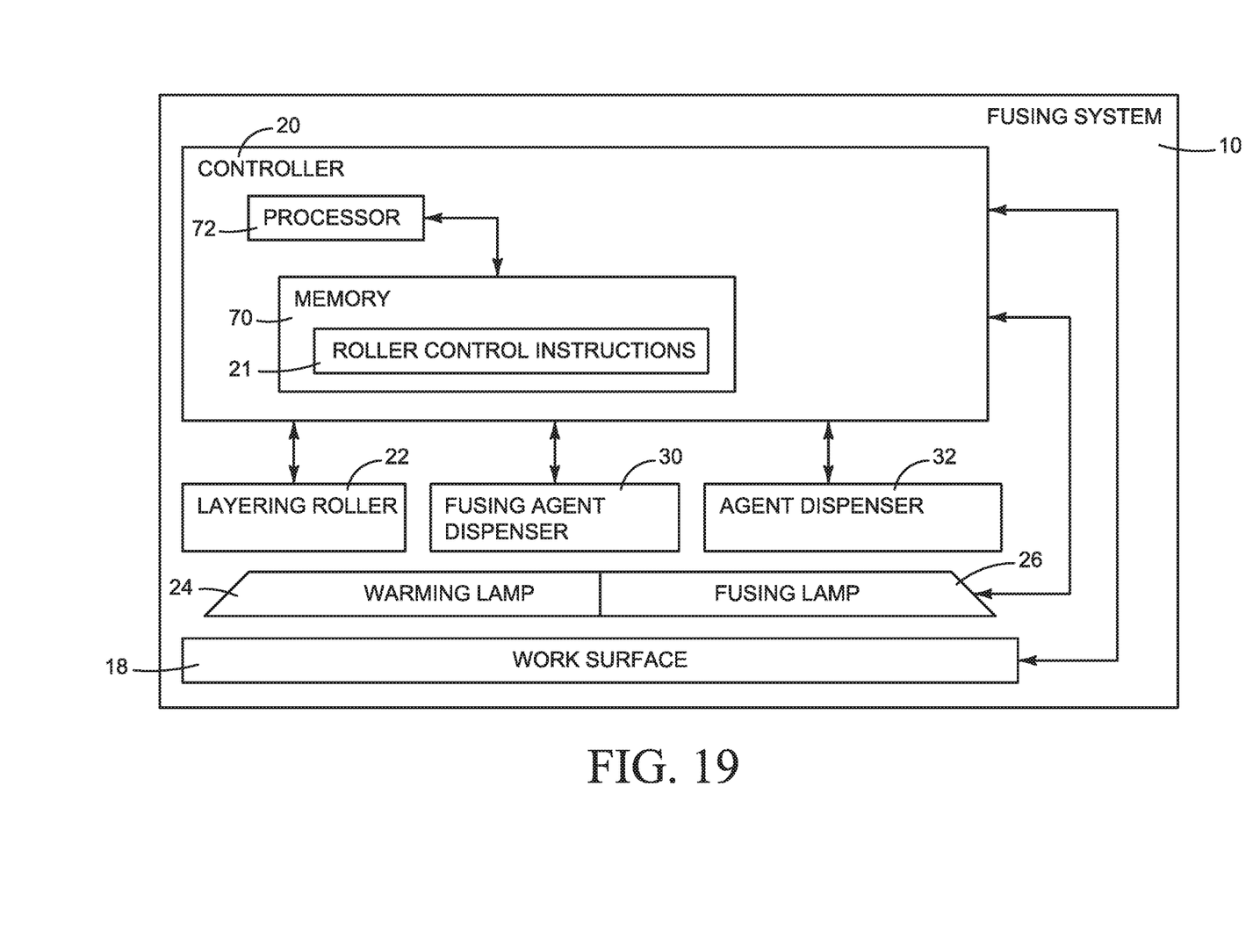
FIG. 19 is a block diagram illustrating a fusing system such as that shown in FIGS. 1-18.

FIG. 19 is a block diagram illustrating a fusing system 10 such as that shown in FIGS. 1-18. Referring to FIG. 19, fusing system 10 includes a controller 20 programmed with roller control instructions 21, a layering roller 22, a warming lamp 24, and a fusing lamp 26. System 10 also includes a first, fusing agent dispenser 30 to dispense a fusing agent on to a work surface 18 and a second agent dispenser 32 to dispense a fusing agent and/or other functional agents on to work surface 18. As described above, a controller 20 represents the processing and memory resources, programming, and the electronic circuitry and components needed to control the operative elements of system 10. In particular, controller 20 includes a memory 70 with roller control instructions 21 and a processor 72 to read and execute instructions 21, for example to implement the process shown in FIGS. 1-18. Fusing system controller 20 may be implemented as part of a 3D printer controller or as a discrete fusing system controller, and may include multiple components among different system components to implement the desired functionality. For one example, the programming and thus the functionality for roller control in a controller 20, including memory 70 with instructions 21 and processor 72, may be implemented in an ASIC or other programmable circuitry that performs the controls functions for roller 22. For another example, the roller control functions in a controller 20 may be implemented with a general purpose processor 72 executing instructions 21 retrieved from a discrete memory 70.

Figure 20:
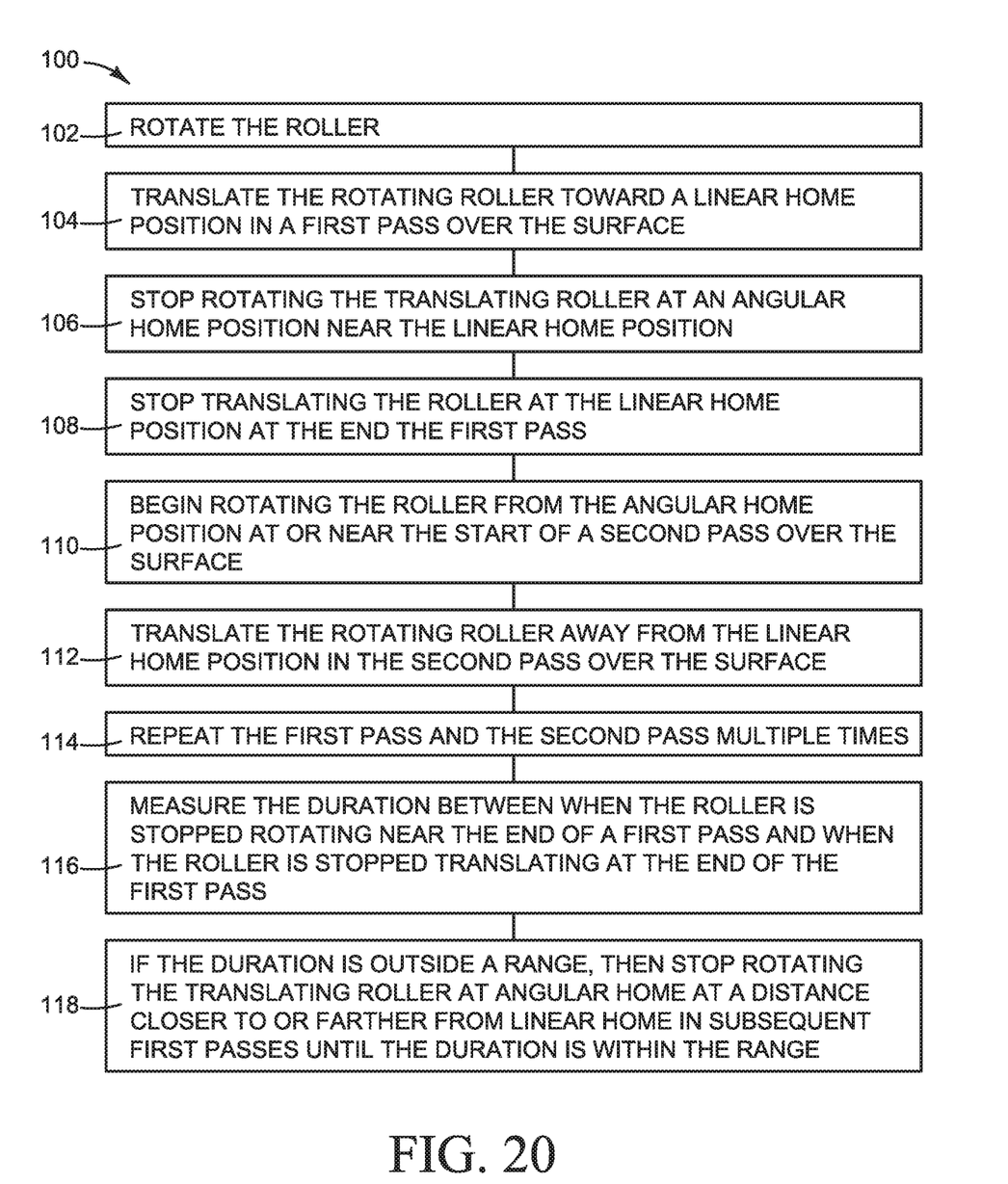
FIG. 20 is a flow diagram illustrating an example layering roller control process for a 3D printer, such as might be implemented through a fusing system shown in FIGS. 1-19.

FIG. 20 illustrates an example process 100 for a 3D printer, such as might be implemented through a controller 20 executing instructions 21 in a fusing system 10 shown in FIGS. 1-19. Part numbers in the description of FIG. 20 refer to FIGS. 1-18. Referring to FIG. 20, process 100 includes rotating a layering roller 22 (block 102), translating the rotating roller 22 towards a linear home position 42 in a first pass over a work surface 18 (block 104), stop rotating the translating roller 22 at an angular home position 46 near linear home 42 (block 106), and stop translating roller 22 at linear home 42 at the end of the first pass (block 108). Then, begin rotating roller 22 from angular home 46 at or near the start of a second pass over work surface 18 (block 110), translating the rotating roller 22 away from linear home 42 on the second pass over work surface 18 (block 112) and repeating the first pass and the second pass multiple times (block 114).

Process 100 also includes measuring the duration between when roller 22 is stopped rotating near the end of a first pass and when roller 22 is stopped translating at the end of the first pass (block 116) and, if the measured duration is outside a range, then stop rotating the translating roller at angular home 46 at a distance closer to or farther from linear home 42 iteratively in subsequent first passes until the measured duration is within the range (block 118).

Figure 21A:
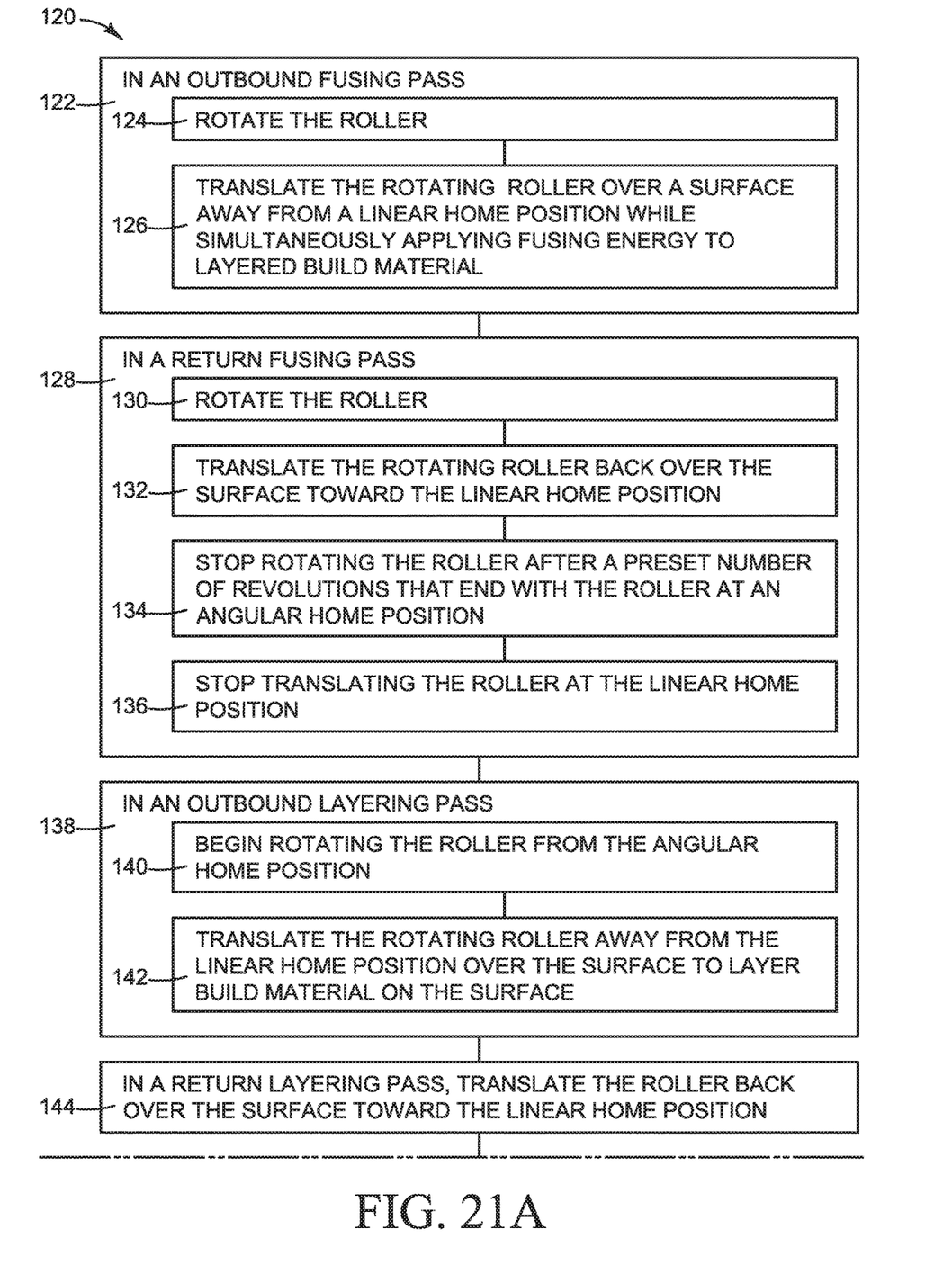
FIGS. 21A and 21B are a flow diagram illustrating another example layering roller control process for a 3D printer, such as might be implemented through a fusing system shown in FIGS. 1-19.
Figure 21B:
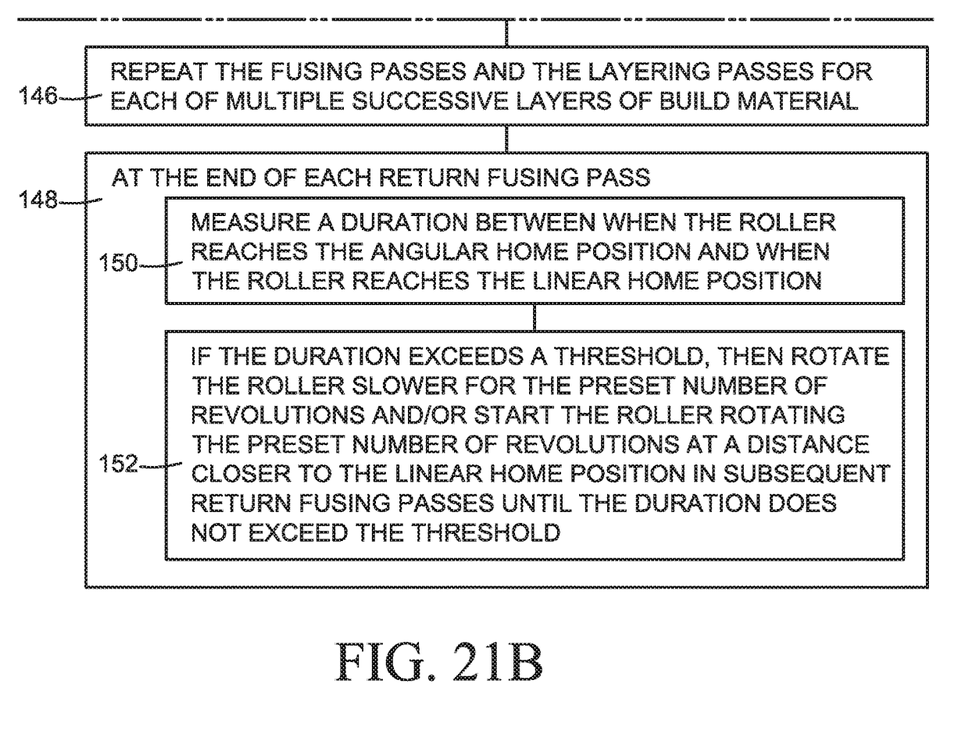

FIGS. 21A and 21B illustrate another example process 120 for a 3D printer, such as might be implemented through a controller 20 executing instructions 21 in a fusing system 10 shown in FIGS. 1-19. Part numbers in the description of FIGS. 21A and 21B refer to FIGS. 1-18. Referring to FIGS. 21A and 21B, process 120 includes, in an outbound fusing pass (block 122), rotating a layering roller 22 (block 124) and translating the rotating roller 22 over a work surface 18 away from a linear home position 42 while simultaneously applying fusing energy to layered build material (block 126).

In a return fusing pass (block 128), begin rotating roller 22 from position 62 (block 130), translating the rotating roller 22 back over work surface 18 toward linear home 42 (block 132), stop rotating roller 22 after a preset number of revolutions that end with roller 22 at angular home 46 (block 134), and stop translating roller 22 at linear home 42 (block 136).

In an outbound layering pass (block 138), begin rotating roller 22 from angular home 46 (block 140) and translating the rotating roller 22 away from linear home 42 over surface 18 to layer build material on surface 18 (block 142).

In a return layering pass, translating roller 22 back over surface 18 toward linear home 42 (block 144) and then repeating the fusing passes and the layering passes for each of multiple successive layers of build material (block 146).

Process 120 also includes, at the end of each return fusing pass (block 148), measuring the duration between when roller 22 reaches angular home 46 and when roller 22 reaches linear home 42 (block 150) and, if the measured duration exceeds a threshold, then rotating roller 22 slower for the preset number of revolutions and/or starting roller 22 rotating the preset number of revolutions at a distance closer to linear home 42 in subsequent return fusing passes until the measured duration does not exceed the threshold (block 152).

The examples shown in the figures and described above illustrate but do not limit the patent, which is defined in the following Claims.

"A" and "an" used in the claims means one or more.

The invention claimed is:

1. A roller control system for a 3D printer, comprising:
a roller to layer build material on a surface; and
a controller operatively connected to the roller and programmed to:
rotate the roller;
translate the rotating roller toward a linear home position in a first pass over the surface;
stop rotating the translating roller at an angular home position;
stop translating the roller at the linear home position at the end the first pass;
begin rotating the roller from the angular home position at or near the start of a second pass over the surface;
translate the rotating roller away from the linear home position in the second pass;
repeat the first pass and the second pass multiple times;
measure a duration between when the roller reaches the angular home position and when the roller is stopped translating at the end of the first pass; and
if the duration is outside a range, then in subsequent first passes stop rotating the translating roller at the angular home position at a distance closer to or farther from the linear home position until the duration is within the range.

2. The system of claim 1, wherein the controller is to shift the angular home position incrementally a fraction of one roller revolution in each of multiple first passes so that the angular home position moves incrementally around the roller.

3. The system of claim 1, wherein the controller is to change a rotational speed of the rotating roller in each of successive first passes so that the roller is stopped rotating at the angular home position at a distance closer to or farther from the linear home position than in the immediately preceding first pass, until the duration is within the range.

4. The system of claim 3, wherein:
each first pass is a fusing pass comprising an outbound fusing pass followed by a return fusing pass;
each second pass is a layering pass comprising an outbound layering pass followed by a return layering pass; and
a translational speed of the rotating roller is the same on the outbound fusing pass and the return fusing pass.

5. The system of claim 1, wherein the controller is to start the roller rotating at a distance closer to or farther from the linear home position in successive first passes so that the roller is stopped rotating at the angular home position at a distance closer to or farther from the linear home position than in the immediately preceding first pass, until the duration is within the range.

6. The system of claim 5, wherein:
each first pass is a fusing pass comprising an outbound fusing pass followed by a return fusing pass;
each second pass is a layering pass comprising an outbound layering pass followed by a return layering pass; and
a translational speed of the rotating roller is the same in the outbound fusing pass and the return fusing pass.

7. The system of claim 1, wherein the range is 50 ms-250 ms.

8. A memory having processor readable instructions programmed to, in a 3D printer fusing system that includes a roller to layer build material on a surface:
rotate the roller;
translate the rotating roller toward a linear home position in a first pass over the surface;
stop rotating the translating roller at an angular home position;
stop translating the roller at the linear home position at the end of the first pass;
begin rotating the roller from the angular home position at or near the start of a second pass over the surface;
translate the rotating roller away from the linear home position in the second pass;
repeat the first pass and the second pass multiple times;
measure a duration between when the roller reaches the angular home position and when the roller is stopped translating at the end of the first pass; and
if the duration is outside a range, then in subsequent first passes stop rotating the translating roller at the angular home position at a distance closer to or farther from the linear home position until the duration is within the range.

9. The memory of claim 8, comprising instructions to shift the angular home position incrementally a fraction of one roller revolution in each of multiple first passes so that the angular home position moves incrementally around the roller.

10. The memory of claim 8, comprising instructions to change a rotational speed of the rotating roller in each of successive first passes so that the roller is stopped rotating at the angular home position at a distance closer to or farther from the linear home position than in the immediately preceding first pass, until the duration is within the range.

11. A 3D printer comprising the roller control system of claim 8.

12. A roller control process for a 3D printer that includes a roller to layer build material on a surface, comprising:
rotating the roller; and
translating the rotating roller toward a linear home position in a first pass over the surface
stop rotating the translating roller at an angular home position;
stop translating the roller at the linear home position at the end of the first pass;
begin rotating the roller from the angular home position at or near the start of a second pass over the surface;
translating the rotating roller away from the linear home position in the second pass;
repeating the first pass and the second pass multiple times;
measuring a duration between when the roller reaches the angular home position and when the roller is stopped translating at the end of the first pass; and
if the duration exceeds is outside a range, then stop rotating the translating roller at the angular home position at a distance closer to or farther from the linear home position until the duration is within the range.

13. The process of claim 12, comprising shifting the angular home position incrementally a fraction of one roller revolution in each of multiple first passes so that the angular home position moves incrementally around the roller.

14. The process of claim 12, comprising changing a rotational speed of the rotating roller in each of successive first passes so that the roller is stopped rotating at the angular home position at a distance closer to or farther from the linear home position than in the immediately preceding first pass, until the duration is within the range.

15. The process of claim 12, wherein:
each first pass is a fusing pass comprising an outbound fusing pass followed by a return fusing pass;
each second pass is a layering pass comprising an outbound layering pass followed by a return layering pass; and a translational speed of the rotating roller is the same on the outbound fusing pass and the return fusing pass.

\* \* \* \* \*